United States Patent
Le Mat et al.

(10) Patent No.: US 10,654,355 B2
(45) Date of Patent: May 19, 2020

(54) NOZZLE FOR FILLING A FUEL TANK, COMPRISING A LIQUID-VAPOUR SEPARATOR HAVING TWO POSITIONS

(71) Applicant: PLASTIC OMNIUM ADVANCED INNOVATION AND RESEARCH, Brussels (BE)

(72) Inventors: Yvan Le Mat, Paris (FR); Pierre Oszwald, Berneuil sur Aisne (FR)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 648 days.

(21) Appl. No.: 15/108,983

(22) PCT Filed: Dec. 26, 2014

(86) PCT No.: PCT/FR2014/053565
§ 371 (c)(1),
(2) Date: Jun. 29, 2016

(87) PCT Pub. No.: WO2015/101750
PCT Pub. Date: Jul. 9, 2015

(65) Prior Publication Data
US 2016/0325619 A1    Nov. 10, 2016

(30) Foreign Application Priority Data
Dec. 30, 2013    (FR) ...................... 13 63691

(51) Int. Cl.
*B01D 46/00*    (2006.01)
*B60K 15/035*    (2006.01)
(Continued)

(52) U.S. Cl.
CPC ........ *B60K 15/03504* (2013.01); *B01D 45/06* (2013.01); *B01D 45/08* (2013.01);
(Continued)

(58) Field of Classification Search
CPC .............. B60K 15/03504; B60K 15/04; B60K 2015/03538; B60K 2015/03514;
(Continued)

(56) References Cited

U.S. PATENT DOCUMENTS 2,599,139 A    6/1952    Stevenson
3,811,252 A    5/1974    Evans et al.
(Continued)

FOREIGN PATENT DOCUMENTS

CN    1295942 A    5/2001
CN    1696489 A    11/2005
(Continued)

OTHER PUBLICATIONS

International Search Report dated May 26, 2015 in PCT/FR2014/053565 Filed Dec. 26, 2014.
(Continued)

*Primary Examiner* — Dung H Bui
(74) *Attorney, Agent, or Firm* — Oblon, McClelland, Maier & Neustadt, L.L.P.

(57) ABSTRACT

A filling nozzle of a fuel tank including a receiving pipe and a liquid-vapor separator, includes a hollow body communicating with an intake pipe for a stream of vapors from the fuel tank, an emptying pipe flowing into the receiving pipe, and a vapor outlet pipe. The hollow body includes a separation mechanism extracting droplets and including at least one wall movable between first and second configurations. In the first configuration the movable wall forms, together with walls of the hollow body, a maze in which stream of vapors passing from the intake pipe towards the outlet pipe is forced to circulate. In the second configuration the movable wall allows the stream of vapors to pass from the intake
(Continued)

pipe to the outlet pipe following a path that avoids all or part of the path travelled by the vapors when the movable walls are in the first configuration.

16 Claims, 9 Drawing Sheets (51) Int. Cl.
*B01D 45/06* (2006.01)
*B01D 45/08* (2006.01)
*B01D 45/10* (2006.01)
*B60K 15/04* (2006.01)
*B01D 47/02* (2006.01)
*F23J 11/00* (2006.01)

(52) U.S. Cl.
CPC .............. *B01D 45/10* (2013.01); *B60K 15/04* (2013.01); *B01D 47/025* (2013.01); *B60K 2015/03509* (2013.01); *B60K 2015/03514* (2013.01); *B60K 2015/03538* (2013.01); *B60K 2015/03576* (2013.01); *F23J 11/00* (2013.01)

(58) Field of Classification Search
CPC ........... B60K 2015/03576; B60K 2015/03509; B01D 45/06; B01D 45/08; B01D 45/10; B01D 47/025; F23J 11/00
See application file for complete search history.

(56) References Cited

U.S. PATENT DOCUMENTS

| | | |
|---|---|---|
| 5,027,868 A | 7/1991 | Morris |
| 2015/0096625 A1* | 4/2015 | Mills ..................... F16K 17/048 137/12 |

FOREIGN PATENT DOCUMENTS

| | | |
|---|---|---|
| DE | 262921 | 5/1912 |
| DE | 10 2006 004 630 A1 | 8/2007 |
| EP | 1 068 980 A2 | 1/2001 |
| GB | 573603 | 11/1945 |
| JP | 2008-8238 A | 1/2008 |
| JP | 2009-214803 A | 9/2009 |
| JP | 2010-17823 A | 1/2010 |
| WO | 2013/158007 A1 | 10/2013 |

OTHER PUBLICATIONS

French Search Report dated Aug. 21, 2014 in FR 1363691 Filed Dec. 30, 2013 (with Translation of Category of Cited Documents in attached foreign language Search Report).

* cited by examiner

NOZZLE FOR FILLING A FUEL TANK, COMPRISING A LIQUID-VAPOUR SEPARATOR HAVING TWO POSITIONS

The invention concerns the field of filling systems for a fuel tank of a vehicle, and more particularly devices for liquid-vapor separation arranged on the filler neck and normally placed at the inlet to the pipe carrying the fuel to the tank.

Liquid-vapor separating devices are known from the prior art. They are connected firstly to a fuel vapor evacuation device arranged in the tank, and secondly to a vapor filtration system which treats the vapors before they are returned to the atmosphere. Their function is to extract the droplets and condensate present in the vapor escaping from the tank so as to avoid overloading the vapor treatment system. The separation device therefore comprises separating means and drainage means allowing the liquid elements captured in the separator to be returned to the tank.

These devices may be installed on the fuel tank as proposed in publication U.S. Pat. No. 6,405,747, or directly on the filler neck as proposed by publication US 2008/018972. The second form of mounting allows, amongst other advantages, the recovery of condensate as far downstream as possible from the duct carrying the vapors from the tank to the filtration device.

A liquid-vapor separator usually takes the form of a hollow body in which fixed walls are arranged, oriented vertically and forming a labyrinth through which the vapors circulate. The fuel droplets are retained by the walls of the labyrinth, on which they flow under gravity and are recovered in the drainage means. The drainage means are connected to the fuel tank by a pipe, or preferably open directly into the receiving pipe of the filler neck.

When the vehicle is running, the droplets extracted from the vapors coming from the tank are returned directly into the filler neck and return to the tank via said neck. The vapors may also be returned to the filler neck via the drainage pipe, which allows the pressures in the circuit to be balanced. Since the filler neck is closed by the vehicle filler cap, the vapors cannot therefore escape towards the outside via this channel.

However when the tank is being filled, the vapor flow increases and part of this flow may then escape to atmosphere via the filler neck which is in the open position.

Therefore a device is provided allowing the drainage pipe to be isolated from the filler neck during this operation. This device may take the form of a valve which closes the passage between the drainage pipe and the filler neck, and which is activated when a nozzle is introduced into the filler neck.

It is however noted that when filling begins, and consequently when the vapor flow is great, the filling operation is disrupted by the premature closure of the filling nozzle. This disruption is caused by excessive overpressure in the fuel tank.

The object of the invention is to provide an original solution for this drawback.

The filler neck of a fuel tank according to the invention comprises a receiving pipe intended to receive a filling nozzle, and a liquid-vapor separator comprising a hollow body into which a single vapor flow inlet pipe from the fuel tank, a drainage pipe flowing into the receiving pipe, and a vapor outlet pipe open, said hollow body containing separating means allowing the extraction of droplets present in the vapor flow such that they flow into the drainage pipe.

The filler neck is characterized in that the separating means comprise at least one wall movable between a first and a second configuration such that in the first configuration, the movable wall together with the walls of the hollow body forms a labyrinth in which the vapor flow passing from the inlet pipe to the outlet pipe is forced to circulate along a given path, and that in the second configuration, the movable wall is arranged so as to define a passage in which the vapor flow circulates from the inlet pipe to the outlet pipe along a path avoiding all or part of the path taken by said vapors when the movable wall is in the first configuration, the cross-section of said passage being arranged such that the load loss suffered by the vapor flow circulating in the hollow body between the inlet pipe and the outlet pipe is strictly smaller than that suffered by a same vapor flow when the movable wall is in the first configuration.

Thus when the tank is being filled and the nozzle is inserted in the receiving pipe of the neck, the movable wall of the separating means is placed in the second configuration such that the load loss between the inlet pipe and the outlet pipe is substantially reduced. Because of this reduced load loss relative to the first configuration, the vapor flow then no longer passes via the labyrinth of walls serving to capture droplets, and passes more directly from the inlet pipe to the outlet pipe in the direction of the filter. The flow of the vapor is greatly facilitated thereby, which allows a reduction in the overpressure in the tank and avoids premature closure of the nozzle.

The separating means are returned to the first position when the filling operation is completed and the operator withdraws the filling nozzle from the neck.

The invention may also comprise multiple embodiments, the characteristics of which taken in isolation or in combination are as follows:

The separating means of the liquid-vapor separator comprise at least one wall movable in rotation about a preferably vertical axis.

The hollow body of the liquid-vapor separator has the general form of a cylinder with the same axis as the axis of rotation of the movable wall, and a circular cross-section, the inner diameter of which is substantially equal to a width of said movable wall.

The separating means of the liquid-vapor separator comprise two movable walls, arranged such that when placed in said second configuration, the sections of the intersection of the inlet pipe and the outlet pipe with the hollow body are contained in a space located between the two movable walls.

The liquid-vapor separator of the filler neck also comprises an isolating partition connecting together the two movable walls and arranged such that when the movable walls are placed in the second configuration, the inlet pipe and the outlet pipe communicate via a passage isolated from the drainage pipe and contained between the two movable walls and situated between an upper plate and the isolating partition.

The filler neck comprises a valve movable between an open position opening the passage between the drainage pipe and the receiving pipe when the separating means are in the first configuration, and a closed position closing the communication between the drainage pipe and the receiving pipe when the separating means are in the second configuration.

The separating means of the liquid-vapor separator comprise at least one wall movable in rotation about a preferably horizontal axis, and for which:
  in said first configuration, the movable wall of the liquid-vapor separator is arranged substantially perpendicular to the vapor flow entering the hollow body via the inlet pipe,
  in said second configuration, the movable wall of the liquid-vapor separator is arranged such that the inlet pipe and the outlet pipe are isolated from the drainage pipe.
The hollow body of the liquid-vapor separator has a substantially cylindrical or hemispherical form, and the movable wall pivots about an axis situated in an equatorial plane of the hollow body and has a form similar to an inner equatorial cross-section of said hollow body.
The separating means of the liquid-vapor separator are movable in translation in a direction.
The hollow body has a substantially cylindrical form and the separating means comprise a piston which is movable in translation inside the hollow body along a preferably vertical axis and comprises a head, the cross-section of which corresponds to the inner cross-section of the hollow body, and a wall extending below said head substantially perpendicular to the vapor flow entering the hollow body via the inlet pipe, such that:
  in the first configuration, the sections of intersection of the inlet pipe and outlet pipe with the hollow body are arranged below the head of the movable piston, such that the wall of the movable piston together with the walls of the hollow body forms a labyrinth in which the vapor flow travelling from the inlet pipe to the outlet pipe is forced to circulate,
  in the second configuration, said sections of intersection of the inlet pipe and outlet pipe with the hollow body are arranged above the head of the movable piston so as to isolate the inlet pipe and the outlet pipe from the drainage pipe.
The separating means comprise at least one fixed wall extending from the upper part of the hollow body in a direction substantially perpendicular to the vapor flow entering the hollow body via the inlet pipe, along which fixed wall a movable wall slides parallel to the fixed wall, such that:
  in the first configuration, the movable wall is arranged in the extension of the fixed wall so that the vapor flow circulates from the inlet pipe to the outlet pipe along a given path,
  in the second configuration, the movable wall is superposed over the fixed wall so that the vapor flow circulates from the inlet pipe towards the outlet pipe along a shorter path than in the first configuration.
The movable wall is connected via a connecting foot to a shutter such that when the movable wall is arranged in the first configuration, the shutter opens the passage between the drainage pipe and the receiving pipe, and when the movable wall is arranged in the second configuration, the shutter closes the passage between the drainage pipe and the receiving pipe.
The filler neck also comprises means for activating the passage of the liquid-vapor separator from the first configuration to the second configuration when the nozzle is introduced into the receiving pipe of the filler neck.
The liquid-vapor separator comprises elastic means for causing the liquid-vapor separator to pass from the second configuration to the first configuration when the nozzle is withdrawn from the receiving pipe of the filler neck.

The invention will be better understood from viewing the attached drawings which are supplied as examples and have no limitative character, wherein.

Figure 1:
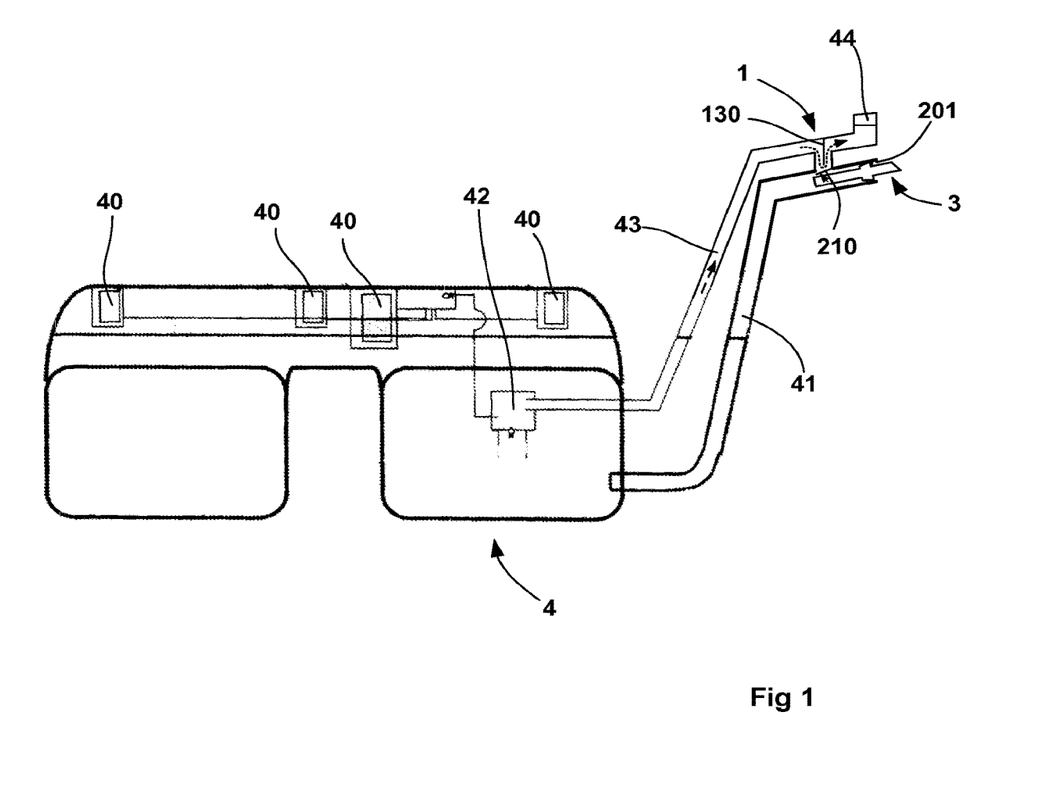
FIG. 1 shows a diagrammatic view of a vehicle fuel tank comprising a filler neck fitted with a liquid-vapor separator.

FIG. 1 illustrates diagrammatically a fuel tank 4 supplied with fuel via a filler neck 41. The head 201 of the filler neck opens into a receiving pipe 200 forming part of the filler neck. The head 201 is adapted to allow the introduction of a filling nozzle 3. The tank is fitted with monitoring and safety devices 40, the functions of which need not be specified in the present description. The fuel vapors are conducted via a vapor evacuation duct 43 from a degasifying unit 42 to the vapor treatment means, such as a hydrocarbon vapor absorption filter 44 (canister) allowing treatment of the hydrocarbon vapors before they are injected into the vehicle engine.

The fuel vapors from the tank are charged with droplets liable to reduce the efficiency of the canister 44. To avoid this drawback, it is proposed to place a liquid-vapor separator 1 on the vapor evacuation duct 43, allowing capture of the fuel droplets so as to allow only the vapors to pass towards the canister 44. The fuel droplets are then reinjected into the tank via the filler neck 41.

The liquid-vapor separator 1 is usually arranged as far downstream as possible from the vapor evacuation duct 43, close to the inlet of the filler neck 41, at the level for example of the receiving pipe 200 into which the filling nozzle 3 is introduced and where it is practical to collect the liquid elements in order to return them to the tank. This arrangement also allows mechanical interaction with the head of said nozzle at the moment of its introduction or withdrawal, so as to modify the state of the elements linked to the separator.

However, by means of some adaptations, it is quite possible, while remaining within the scope of the invention, to install the liquid-vapor separator at any site on the filler neck 41.

It is noted that here, for all embodiments of the invention to which the present description refers, the liquid-vapor separator 1 mounted on the filler neck 41 is connected to a single vapor evacuation duct 43 from the tank 4.

As will be seen in more detail below, the liquid-vapor separator comprises at least one wall 130 placed across the vapor flow from the tank, on which the fuel droplets are deposited and then fall under gravity into the receiving pipe 200, from where they are evacuated to the tank via the filler neck 41. The fuel vapors pass over the wall 130 in the direction of the arrows before reaching the canister 44. This additional pathway imposed on the vapor, in the manner of a labyrinth, is the source of an additional load loss in the vapor evacuation duct 43, the effects of which may extend to the tank 4 where, under certain conditions, a slight overpressure may be found.

In normal operating mode, the head 201 of the filler neck is closed. The vapor flow through the vapor evacuation duct 43 is very slight, and the pressures inside the tank 4, the filler neck 41 and the vapor evacuation duct 43 are substantially balanced because of the connection between the filler neck and the liquid-vapor separator.

When the tank is being filled, a nozzle 3 is introduced via the head 201 into the receiving pipe 200 of the filler neck 41, and the fuel flows on the inside via the filler neck 41 into the tank 4. The vapor flow through the vapor evacuation duct 43 then increases greatly and may escape to atmosphere via the head 201 of the filler neck 41, which is not tightly sealed by the nozzle during this operation. To avoid this drawback, it is proposed to close the passage between the liquid-vapor separator and the filler neck using a valve 210, closure of which is caused by the introduction of the nozzle 3. The vapors passing through the vapor evacuation duct 43 are then forced to circulate through the labyrinth formed by the wall 130. The load loss imposed by the wall 130 rises significantly and creates an overpressure of a few millibars in the tank 4. This overpressure prevents the evacuation of the vapors, and the fuel flows back into the filler neck 41 and under certain circumstances can activate the safety devices placed in the nozzle to prevent backflow phenomena, and may cause the stoppage of the filling process.

FIGS. 2 to 21 depicts various embodiments of the invention, the object of which is to reduce this nuisance. In each of the variants, the elements performing the same functions carry the same reference numerals.

Figure 2:
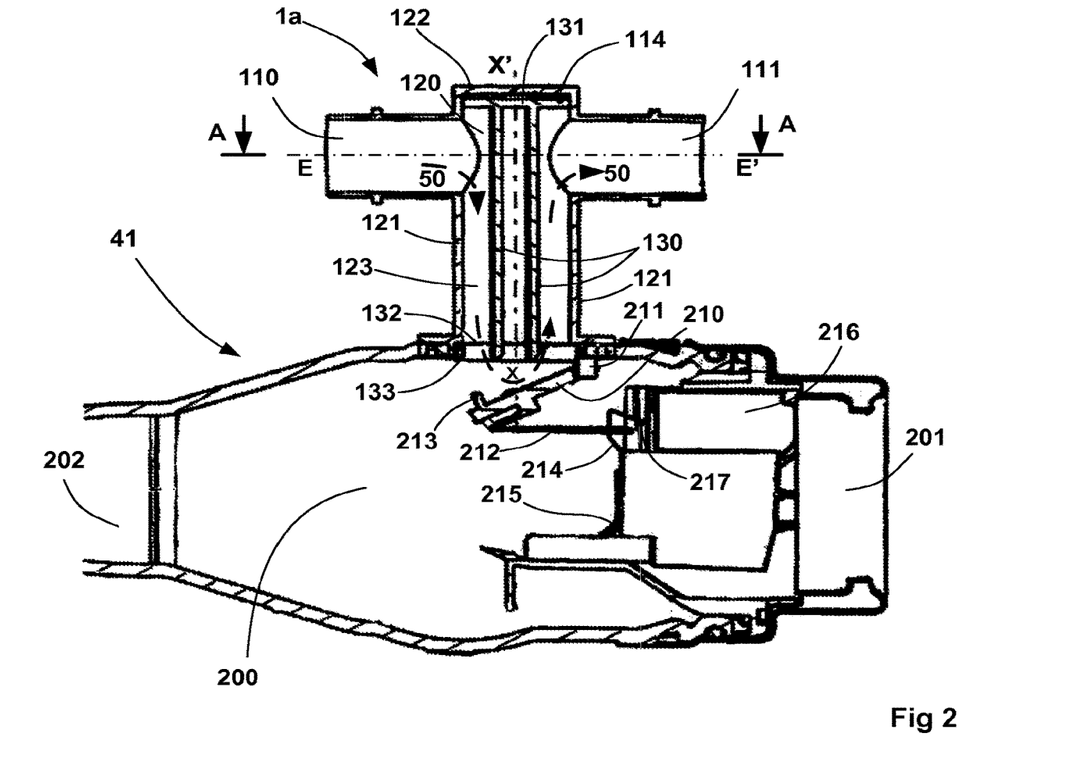
FIG. 2 shows, according to a first embodiment of the invention, a diagrammatic cross-section view of a filler neck fitted with a liquid-vapor separator arranged in the first configuration.

FIG. 2 shows a filler neck 41 according to a first embodiment of the invention, fitted on its upper part with a liquid-vapor separator 1a. The filler neck comprises a widened receiving pipe 200 fitted with a head 201 adapted to receive a nozzle (not shown). The receiving pipe at its outlet 202 is extended by the current section of the neck leading to the tank (not shown).

FIG. 2 illustrates the case in which the walls 130 are placed in the first configuration, i.e. when the filler neck is placed in the configuration for running of the vehicle engine, and wherein the head 201 of the filler neck is sealed by a filler cap (not shown).

The liquid-vapor separator 1a comprises a single inlet pipe 110 connected to the vapor evacuation duct 43 (not shown) from the tank. This inlet pipe 110 opens into a hollow body 120 in which the separating means are arranged, formed from at least one wall and—in the case covered by the present description—two walls 130 placed substantially vertically, i.e. perpendicular to the vapor flow entering the hollow body via the inlet pipe 110. The hollow body 120 is connected to an outlet pipe 111 via which the vapors escape in the direction of the canister. The walls 130 extend into the hollow body 120, the lower part of which serves as a drainage pipe 123 opening directly into the receiving pipe 200. The walls 130 are held together by an upper plate 131 arranged below the upper wall 122 of the hollow body 120, and are movable in rotation about an axis XX'.

Figure 3:
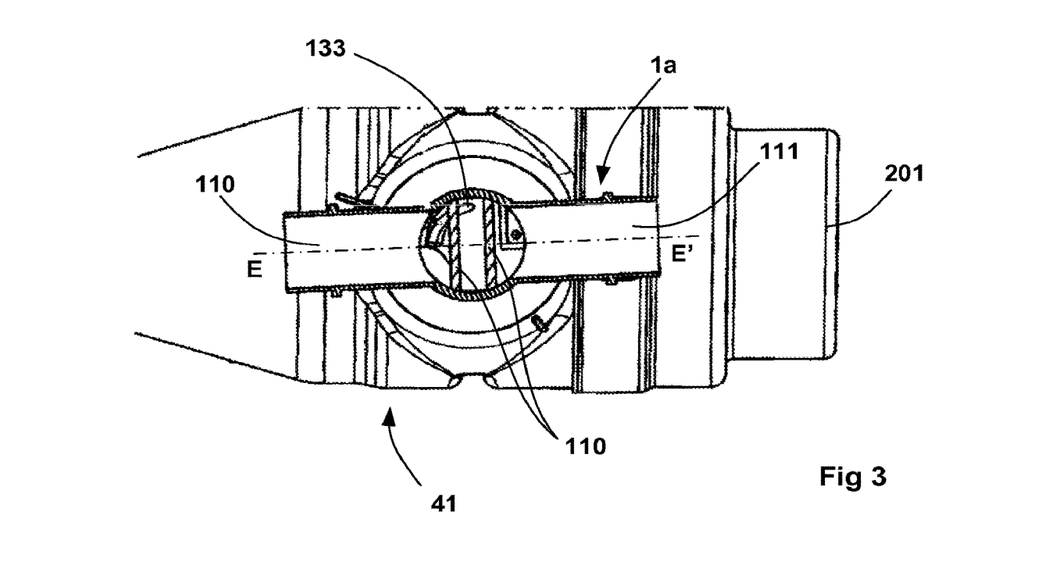
FIG. 3 shows the filler neck according to the first embodiment of the invention in a view from above.

In this first configuration, the walls are oriented so as to form an obstacle and force the vapor flow from the inlet pipe 110 to follow a path 50 passing over said walls 132 in order to escape towards the outlet pipe 111, as indicated by the dotted arrow 50. In the case forming the subject of the present description, the walls are arranged substantially perpendicular to axis EE' of the pipes 110 and 111, as illustrated in FIG. 3 which is a view from above along cross-section A-A of the assembly formed by the liquid-vapor separator 1a and the filler neck 41.

Advantageously, the hollow body 120 and the drainage pipe 123 have a substantially cylindrical form such that by adjusting the width I (see FIG. 4) of the walls 130 to the inner diameter of said cylinder, the vapors from the inlet pipe 110 have no other way of reaching the outlet pipe 111 than by passing below these. In this way, the fuel droplets contained in the vapors are deposited on the walls 130 and on the inner part of the wall 121 of the drainage pipe 123, and then run under gravity towards the receiving pipe 200.

The embodiment of the invention forming the subject of the present description has a vertical axis XX'. This preferred embodiment allows the walls 130 to be arranged such that the vapor droplets flow as directly as possible under gravity from the drainage pipe 123 to the receiving pipe 200. However it is possible to orient the axis XX' differently, taking care to arrange the form of the drainage pipe accordingly to avoid the formation of undesirable pockets liable to accumulate liquid fuel.

The walls 130 are also fixed to a lower plate 132 in which openings are produced to allow the free circulation of vapors and droplets between the drainage pipe 123 and the receiving pipe 200.

According to this first embodiment of the invention, the filler neck has a valve 210 mounted on a hinge 211 of substantially horizontal axis, which valve is intended to seal the passage between the drainage pipe 123 and the receiving pipe 200. The valve 210 at its end has a cam 213 intended to collaborate with a helicoidal ramp 133 arranged in the lower plate 132. An elastic blade 212 intended to collaborate with an elastic lever 214 is arranged below the valve 210.

The elastic lever 214, mounted on a plate 216 via a hinge 217 of horizontal axis and substantially parallel to the axis of hinge 211 of valve 210, comprises at its end a lug 215. The lug 215 and the elastic lever 214 may usefully be electrically grounded.

The movement from the first configuration to the second configuration takes place when a nozzle 3 is introduced into the head 201 of the filler neck when the vehicle is refueled.

The head of the nozzle comes into contact with the lug 215 and pushes it back, causing the elastic lever 214 to turn about its hinge 270. In its movement, the elastic lever 214 carries the blade 212 and causes the valve 210 to pivot about the axis of its hinge 211. The cam 213 penetrates into the helicoidal ramp 133 and drives the lower plate 132, and the walls 130 attached thereto, in rotation about the axis XX'.

Figure 4:
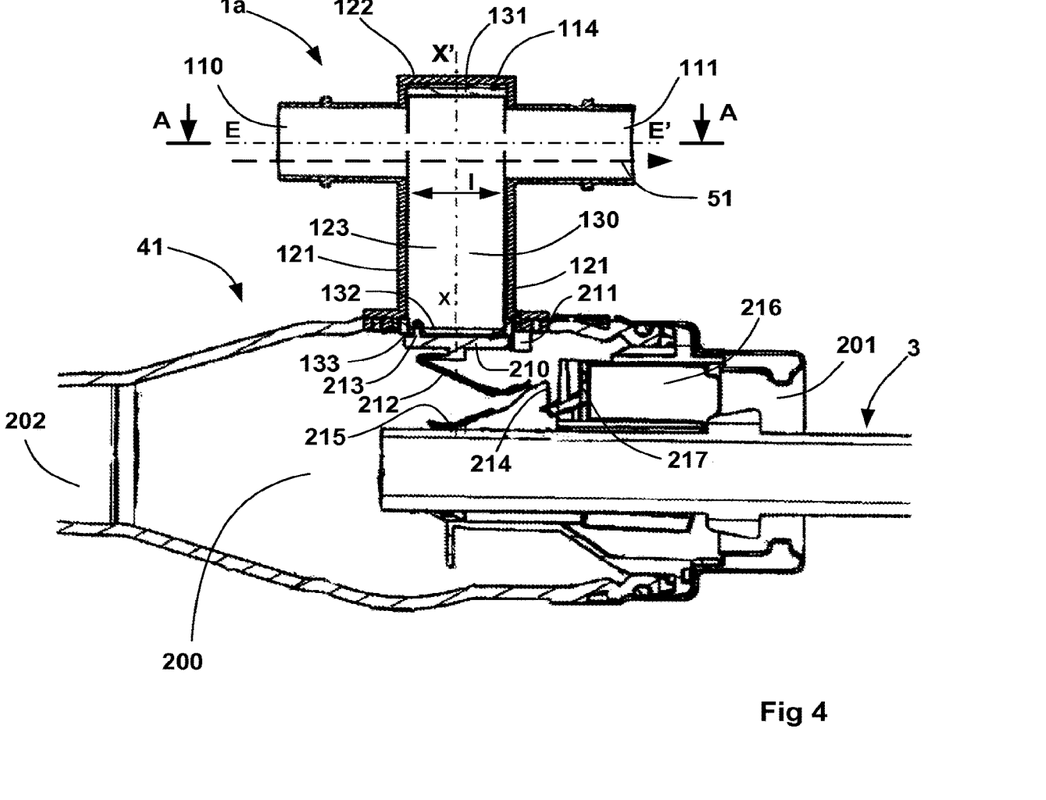
FIG. 4 shows the filler neck according to the first embodiment of the invention, in which the liquid-vapor separator is arranged in the second configuration.
Figure 5:
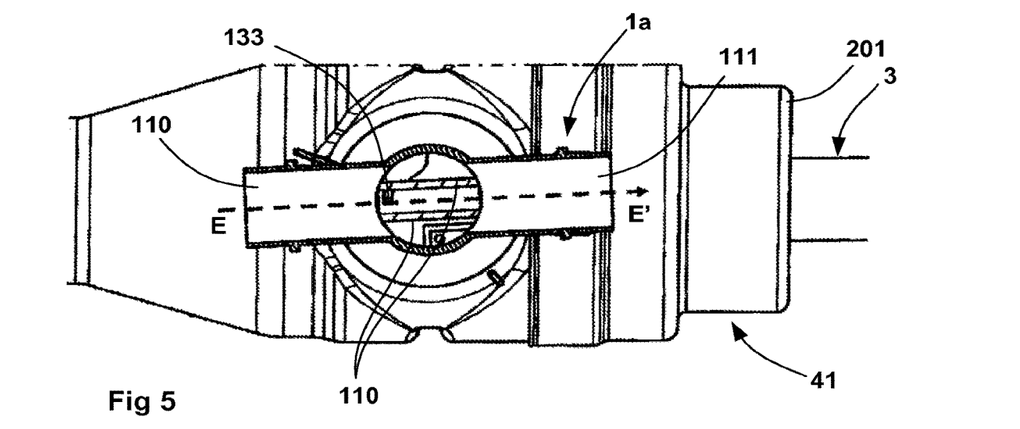
FIG. 5 shows the filler neck according to the first embodiment of the invention in a view from above.

When the valve 210 is in the closed position, the walls 130 have performed a rotation through around 90° to move into the second configuration as illustrated in FIG. 4 and FIG. 5. The walls 130 are then substantially parallel to axis EE' of pipes 110 and 111.

It is noted here that the embodiments forming the subject of the present description have inlet 110 and outlet pipes 111 with axes aligned with axis EE', but it is possible to arrange the respective positions of the inlet and outlet pipes of the hollow body differently and in an equivalent manner by adapting the adjacent elements.

The electrical continuity between the nozzle and the vehicle is ensured by the lug 215 and the elastic lever 214.

In this second configuration, the vapor flow—which is great during the tank filling phase—no longer encounters the obstacle formed by the walls 130 and can flow directly from the inlet pipe 110 to the outlet pipe 111 along a path 51, bypassing the labyrinth formed by the walls 130 and avoiding following the path 50 of the vapors when the walls are arranged in the first configuration, as illustrated by the bold dotted arrow 51. The walls 130 no longer hinder the circulation of the vapor flow, and define a direct passage between the inlet and outlet pipes. Although the passage below the lower plate 132 remains open, the circulation between the inlet 110 and outlet pipes 111 then suffers a smaller load loss and allows the vapors to move towards the canister during the filling phase without causing overpressure in the tank. Closure of the valve 210 also prevents the vapors from escaping to atmosphere via the head of the filler neck 41.

It is noted that when the separating means are in the second configuration, the fuel droplets present in the vapor flow enter via the pipe 110, pass directly to the outlet pipe 111 and the canister 44 because of the lower efficiency of the extraction function operated by the liquid-vapor separator 1 during the tank filling phase. The percentage of droplets extracted from the vapor flow when the separating means are in the second configuration is therefore very much lower than the percentage of droplets extracted, for an identical vapor flow, when the separating means are placed in the first configuration.

When the nozzle is withdrawn, a helicoidal return spring 114 housed in the space between the upper plate 131 and the upper wall 122 of the hollow body 120 brings the walls 130 back to the first configuration illustrated by FIGS. 2 and 3.

FIGS. 6 to 9 illustrate a second embodiment of the invention.

In this variant, the filler neck no longer comprises a valve closing the passage between the drainage pipe 123 and the receiving pipe 200. Also, the walls 130a and 130b are no longer connected by a lower plate.

In the same way as the first embodiment of the invention, the walls 130a and 130b are adjusted to have a width substantially equal to the inner diameter of the cylindrical hollow body 120 and of the drainage pipe 123.

Figure 6:
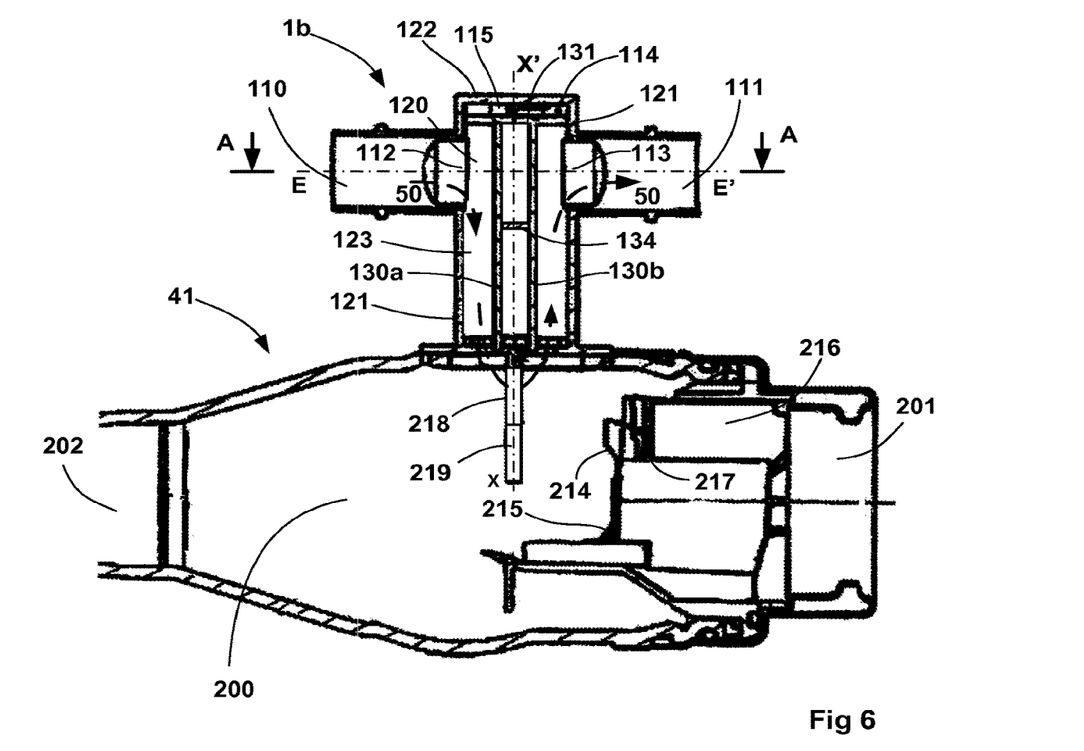
FIG. 6 shows, according to a second embodiment of the invention, a diagrammatic cross-section view of a filler neck fitted with a liquid-vapor separator arranged in the first configuration.
Figure 7:
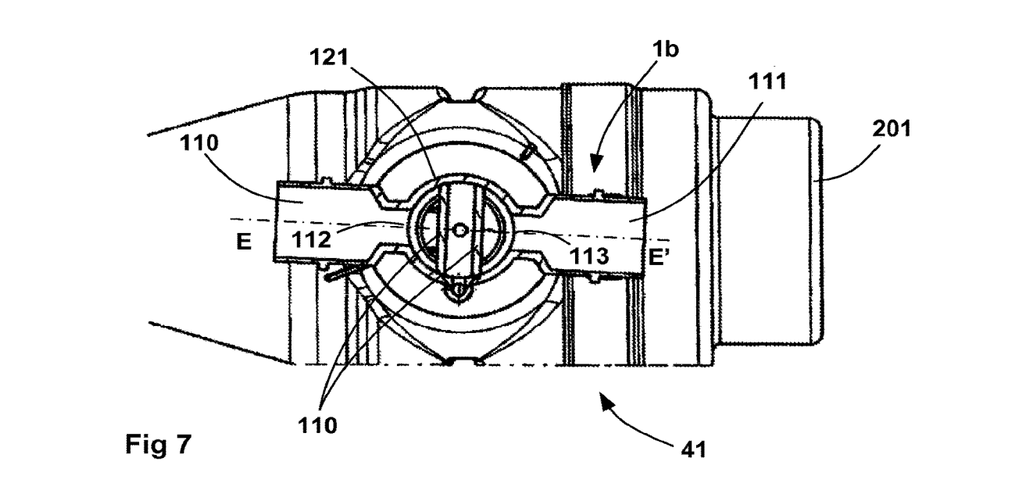
FIG. 7 shows the filler neck according to the second embodiment of the invention in a view from above.

When the liquid-vapor separator 1b is arranged in the first configuration illustrated by FIGS. 6 and 7, the walls 130a and 130b are placed substantially perpendicular to axis EE' of the inlet and outlet pipes 110 and 111, and form a labyrinth forcing the vapor flow from the inlet pipe 110 to the outlet pipe to follow a path 50 (see dotted arrow 50) passing over said walls, such that the droplets present in the vapors run under gravity into the drainage pipe 123 and to the receiving pipe 200.

The movement of rotation of the walls 130a and 130b about axis XX', to move from the first configuration to the second configuration, is achieved by a mechanism 115 housed between the upper plate 131 and the upper wall 122 of the hollow body 120. This mechanism is driven in rotation by a flap 219 arranged at the end of a decentered shaft 218 of vertical axis parallel to axis XX'. The flap 219 is carefully placed on the path of the head of the nozzle 3, such that the movement of introducing the latter into the receiving pipe 200 causes rotation of the flap 219 and of the decentered shaft 218, and rotation of the upper plate carrying the walls 130a and 130b via the mechanism 115. The shaft 218 is decentered so as not to come into contact with the head of the nozzle 3. Preferably, axis XX' is arranged vertically for the same reasons as those already explained above.

Figure 8:
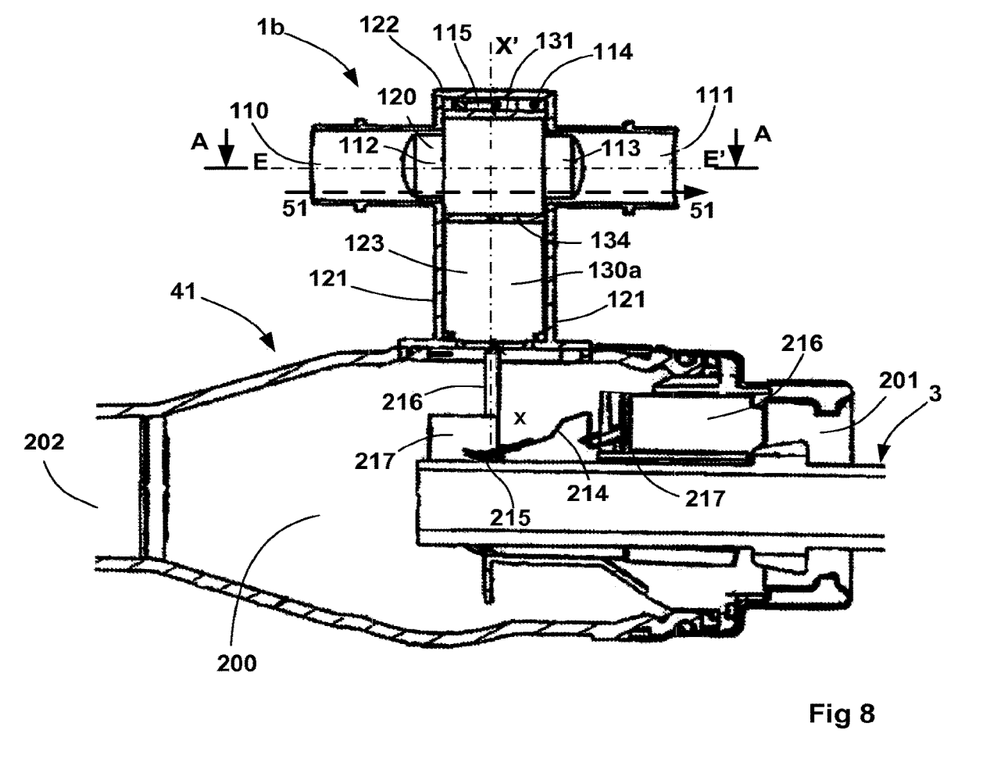
FIG. 8 shows the filler neck according to the second embodiment of the invention, in which the liquid-vapor separator is arranged in the second configuration.
Figure 9:
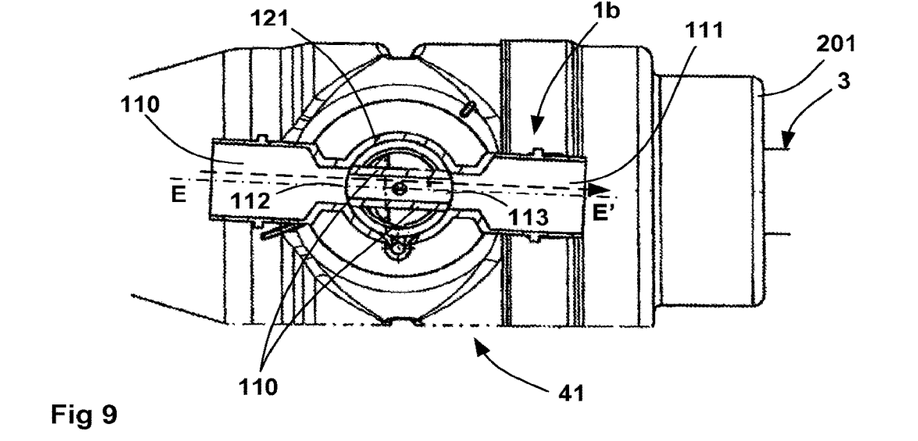
FIG. 9 shows the filler neck according to the second embodiment of the invention in a view from above.

FIGS. 8 and 9 show the filler neck 41 and the liquid-vapor separator 1b in this second embodiment of the invention in the second configuration, in which a filling nozzle 3 is introduced via the head 201 of the filler neck into the receiving pipe 200. Under the action of movement of the flap 219, the walls 130a and 130b have pivoted through around 90° about axis XX' and are now oriented in a direction substantially parallel to axis EE' of the inlet and outlet pipes 110 and 111.

With reference now to FIG. 9 in which the liquid-vapor separator 1b is placed in the second configuration, it is noted that the inlet and outlet pipes 110 and 111 are arranged such that the section of their intersections, respectively 112 and 113, with the wall 122 of the hollow body 120 are contained in the space separating the two walls 130a and 130b. Thus when the walls are in the second configuration, the vapor coming from the tank via the single inlet pipe 110 is forced to circulate between the two walls 130a and 130b to reach the outlet pipe 111.

An isolating partition 134 arranged vertically below the inlet sections 112 and 113 connects the two walls 130a and 130b together and prevents the circulation of vapor towards the receiving pipe 200 during the filling phase when the walls 130a and 130b are arranged in the second configuration.

Thus when the liquid-vapor separator 1 is in the second configuration, in a manner similar to that of the first embodiment, the vapor passes directly from the inlet pipe 110 to the outlet pipe 111, through the inner passage between the upper plate 131, the partition 134 and the two walls 130*a* and 130*b*. This space is isolated from the drainage pipe 123. By carefully adjusting the spacing between the two walls 130*a* and 130*b*, the load loss between the inlet and outlet pipes can easily be reduced and overpressure in the fuel tank avoided.

When the nozzle 3 is withdrawn from the receiving pipe 200 of the filler neck 41, the lug 217 is released, a helicoidal return spring 114 arranged in the space between the upper plate 131 and the upper wall 122 of the hollow body 120 drives the walls 130*a* and 130*b*, together with the lug 217, from the second configuration to the first configuration.

Figure 10:
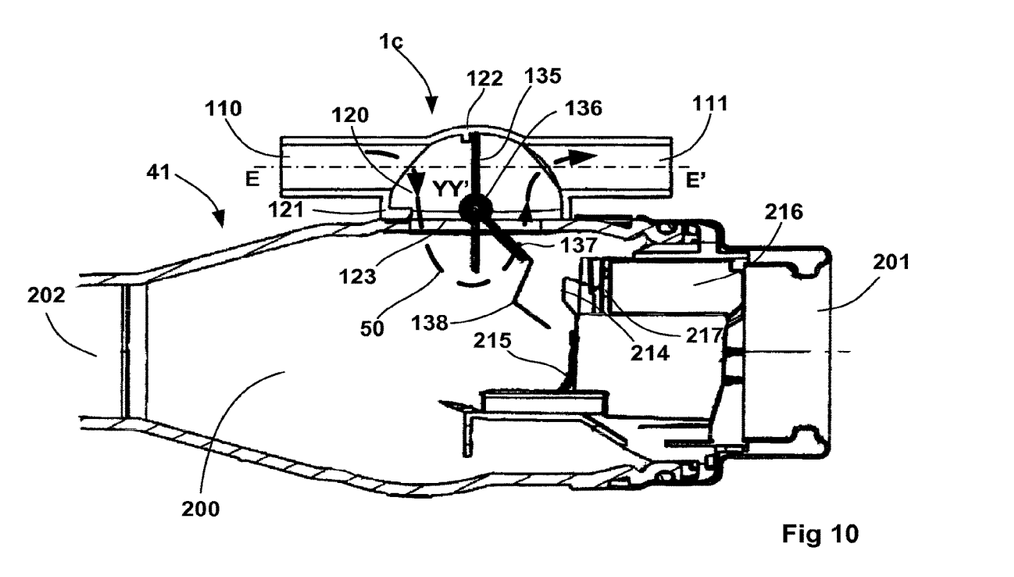
FIG. 10 shows, according to a third embodiment of the invention, a diagrammatic cross-section view of a filler neck fitted with a liquid-vapor separator arranged in the first configuration.
Figure 11:
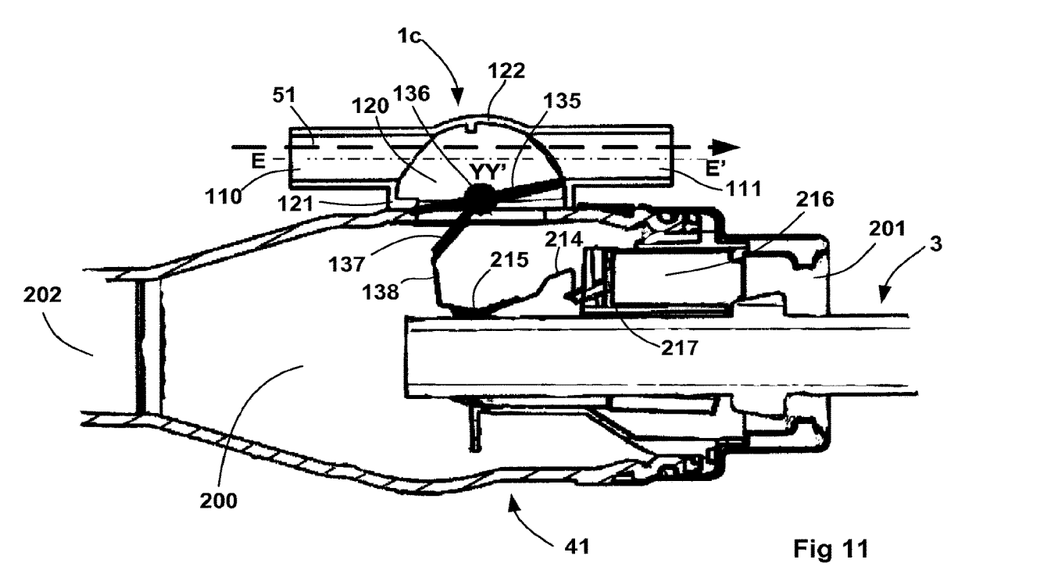
FIG. 11 shows the filler neck according to the third embodiment of the invention, in which the liquid-vapor separator is arranged in the second configuration.

FIGS. 10 and 11 illustrated third embodiment of the invention in which the liquid-vapor separator 1*c* comprises a wall 135 pivoting about a hinge 136 of axis YY'. This axis YY' is arranged, in the context of the example forming the subject the present description, substantially perpendicular to axis EE' of pipes 110 and 111.

Preferably, axis YY' is arranged horizontally. This embodiment allows the walls of the hollow body to be arranged such that the vapor droplets flow as directly as possible under gravity into the receiving pipe 200. In a manner similar to that already described, it is possible to orient the axis YY" differently, taking care to adapt the shape of the hollow body accordingly in order to avoid the creation of undesirable pockets liable to accumulate liquid fuel.

When the separator 1*c* is placed in the first configuration as illustrated in FIG. 10, the wall 135 obstructs the passage between the inlet pipe 110 and the outlet pipe 111, forming a labyrinth. The fuel vapors moving towards the outlet pipe 111 follow a path 50 passing over said wall 135, as illustrated by the bold dotted arrow 50 in FIG. 10. The fuel droplets then flow under gravity along the wall 135 in the direction of the receiving pipe 200.

The wall 135 supports an extension piece 137 extended by an elastic blade 138.

The hinge 136 is arranged vertically below the section of the intersection of the pipes 110 and 111 with the wall 121 of the hollow body 120, such that rotation of the wall 135 about axis YY' closes the passage between the hollow body 120 and the drainage pipe 123, and places the wall 135 in the second configuration as illustrated in FIG. 11. In this second configuration, in the tank filling phase, the vapors from the inlet pipe 110 follow a path 51 separate from the path followed in the first configuration and pass directly from the inlet pipe 110 to the outlet pipe 111, through the passage defined by the hollow body, with a reduced load loss so as not to create overpressure in the tank. The vapors cannot return to the receiving pipe 200.

It is noted at this stage that it would be quite possible to install a valve 120 in the separators according to the second (1*b*) and third (1*c*) embodiments of the invention, arranged between the drainage pipe 123 and the receiving pipe 200 and of the type of that provided in the separator (1*a*) according to the first embodiment of the invention. This addition nonetheless does not appear necessary insofar as the walls 130*a*, 130*b* or 135 ensure, in a simple and economic fashion, the function of separation between the gas circulation path and the receiving pipe 200 during the filling phase, thus preventing the escape of the gasses to atmosphere.

When the nozzle 3 is introduced, the head of the nozzle 3 pushes back the lug 215 and causes the elastic lever 214 to swivel about its hinge 217 such that the lug 215 engages the elastic lever 138 situated in the extension of extension piece 137, and drives the wall 135 in rotation about axis YY'.

The drainage pipe 123 situated between the hollow body and the receiving pipe 200 has a reduced height so as to allow the elastic lever 138 to collaborate simply with the lug 215, such that the lower part of the wall 135 is partly immersed in the pipe 200 when the wall 135 is placed in the first configuration.

In this third embodiment of the invention, the hollow body then assumes the general form of the cylinder of axis YY', or a hemisphere with a diameter passing through axis YY' of the hinge 136. Axis YY' is therefore situated in an equatorial plane of said hollow body. The wall 135 assumes respectively a rectangular or circular form similar to an inner equatorial cross-section of said hollow body.

The form of the cross-section of the passage between the hollow body 120 and the drainage pipe 123 is then similar to the form of the wall so as to obtain a tight closure when the wall 135 is in the second configuration.

A helicoidal spring (not shown) placed about the hinge 136 allows the wall 135 to be returned from the second configuration to the first configuration when the nozzle 3 is withdrawn from the receiving pipe 200.

FIGS. 12 to 17 illustrate a fourth embodiment of the invention in which the movable wall of the drainage means of the liquid-vapor separator 1*d* move in translation along an axis XX' which is preferably oriented vertically.

Figure 12:
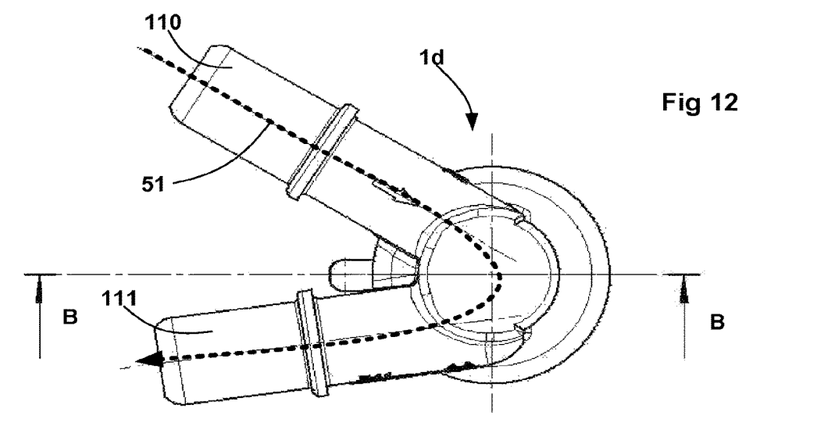
FIG. 12 shows a liquid-vapor separator in a view from above, in a fourth embodiment of the invention.

FIG. 12 shows a view of the liquid-vapor separator from above, in which the axis of the vapor inlet circuit 110 is not aligned with the axis of the outlet circuit 111.

Figure 13:
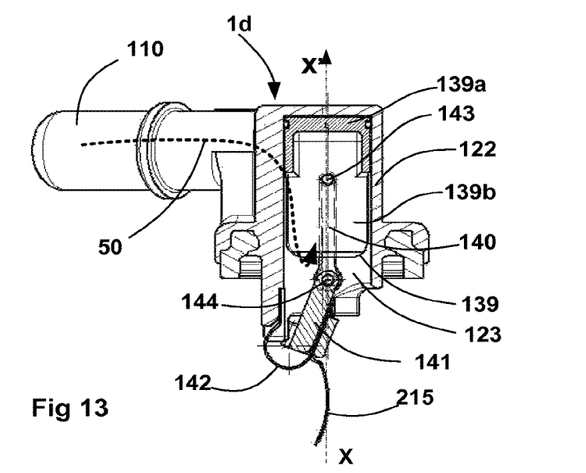
FIG. 13 shows a cross-section view B-B of the liquid-vapor separator according to the fourth embodiment of the invention, arranged in the first configuration.

FIG. 13 is a cross-section view along B-B of the liquid-vapor separator shown in FIG. 12 and arranged in the first configuration.

Figure 14:
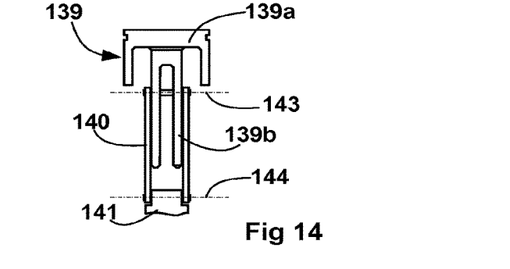
FIG. 14 shows a side view of the movable piston of the liquid-vapor separator according to the fourth embodiment of the invention.

This liquid-vapor separator comprises a movable piston 139, shown in detail on FIG. 14, which moves in the hollow body 120 of substantially cylindrical form and of axis XX'. The axis XX' is oriented preferably in a vertical direction.

The movable piston comprises a head 139*a*, the straight cross-section of which corresponds to the straight cross-section of the hollow body. The piston head 139*a* is extended in its lower part by a wall 139*b* which extends substantially perpendicular to the vapor inlet pipe 110.

The movable piston is driven in movement by a connecting rod 140 hinged by a pin 143 to the movable wall 139*b*. This connecting rod is itself coupled to a drive arm 141 by a connecting pin 144. The drive arm 141 is linked to a lug 215 and to a return spring 142.

When the liquid-vapor separator is arranged in the first configuration, the return spring 142 causes the drive arm to pivot into the vertical position and, under the action of the connecting rod 140, lifts the movable piston 139 into the upper part of the hollow body 120.

In this first configuration, the hollow body 120 is arranged such that the head 139*a* of the movable piston is arranged above the sections of intersection 112 and 113 of the inlet pipe 110 and outlet pipe 111 with the hollow body 120. The wall 139*b* of the movable piston then, with the walls 122 of the hollow body 120, forms a labyrinth in which the vapor flow from the inlet pipe 110 to the outlet pipe 111 is forced to circulate along the path 50 indicated by dotted lines in FIG. 13.

Figure 16:
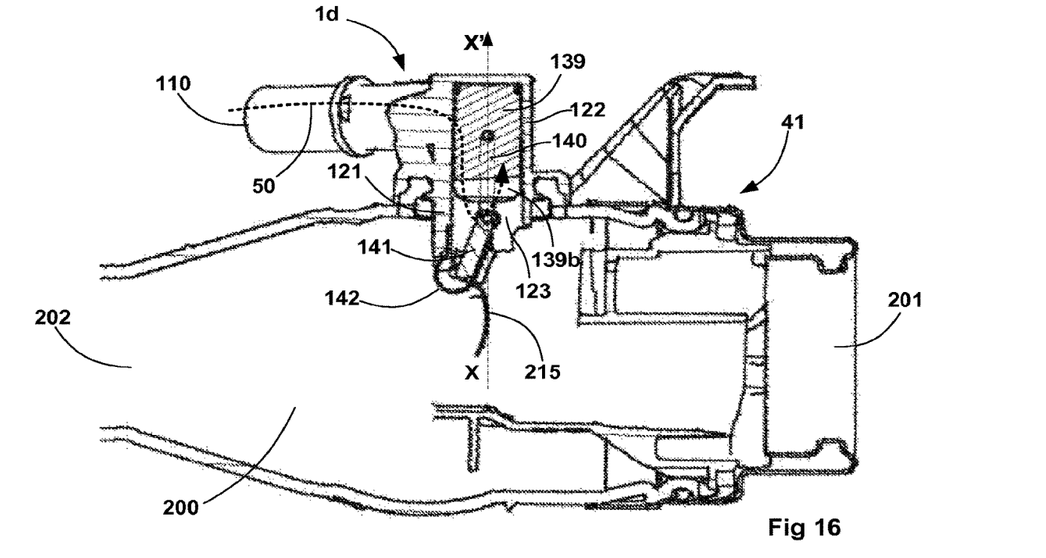
FIG. 16 shows a cross-section view of a filler neck according to the fourth embodiment of the invention, placed in the first configuration.

The droplets then flow under gravity via the drainage pipe 123 into the receiving pipe 200 of the filler neck 41, as shown in FIG. 16 which illustrates a filler neck 41 with a liquid-vapor separator 1*d* according to the fourth embodiment of the invention, arranged in the first configuration.

Figure 15:
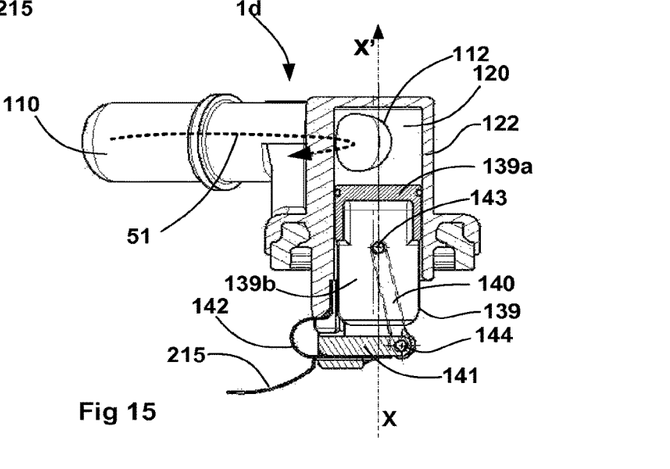
FIG. 15 shows a cross-section view B-B of the liquid-vapor separator according to the fourth embodiment of the invention arranged in the second configuration.

When the drainage means are arranged in the second configuration as shown in FIG. 15, the lug 215 is pushed back under the action for example of introducing a filling nozzle 3. The drive arm 141 swings into the horizontal position and drives the movable piston 139 down via the connecting rod 140.

Figure 17:
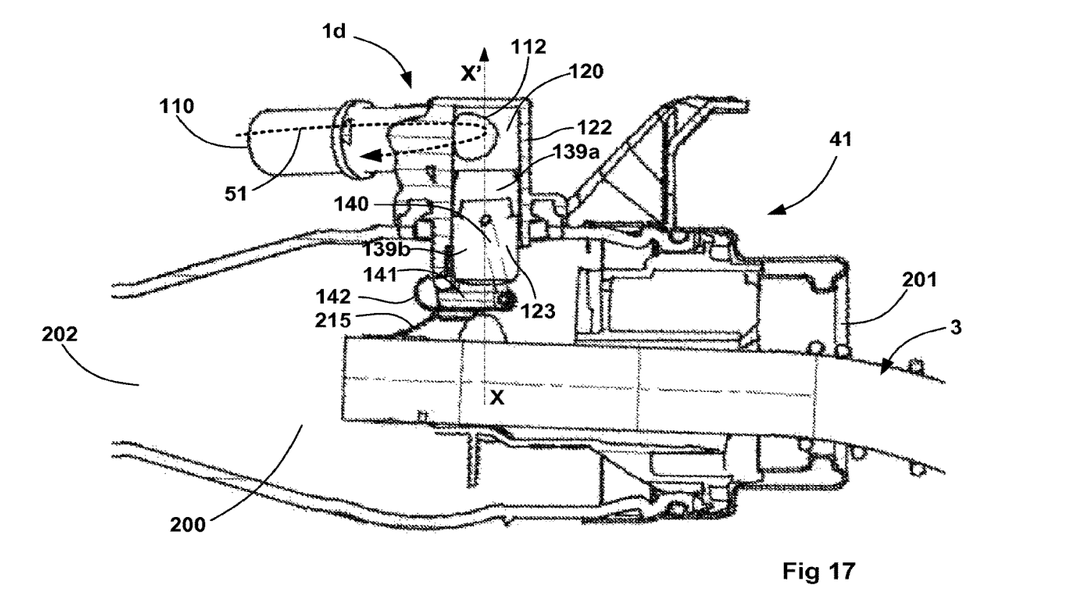
FIG. 17 shows a cross-section view of a filler neck according to the fourth embodiment of the invention, placed in the second configuration.

The head 139a of the movable piston 139 is then placed below the sections of intersection 112 and 113 of the inlet pipe 110 and outlet pipe 111 of the vapor flow, such that the inlet 110 and outlet pipes 111 are isolated from the drainage pipe 123 as shown on FIG. 17. The vapor flow then circulates directly from the inlet pipe 110 to the outlet pipe 111 via the inner passage of the hollow body, following a path 51 and avoiding almost all the path 50 travelled when the movable piston is arranged in the first configuration.

The cross-section of this passage is equal to the cross-section of the hollow body. The load loss suffered by a vapor flow circulating between the inlet and outlet pipes when the separating means are arranged in the second configuration is then very much lower than the load loss suffered by the same vapor flow when the separating means are arranged in the first configuration.

FIGS. 18 to 21 illustrate a fifth embodiment of the invention in which the separating means are formed by a single movable wall moving in translation in a direction XX'.

Figure 18:
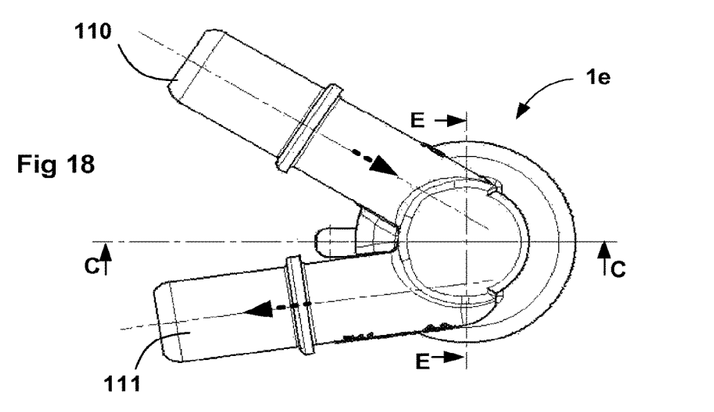
FIG. 18 shows a view similar to FIG. 12, of a liquid-vapor separator according to a fifth embodiment of the invention.

FIG. 18 shows a view of the liquid-vapor separator from above, in which the inlet 110 and outlet pipes 111 form an obtuse angle.

Figure 19:
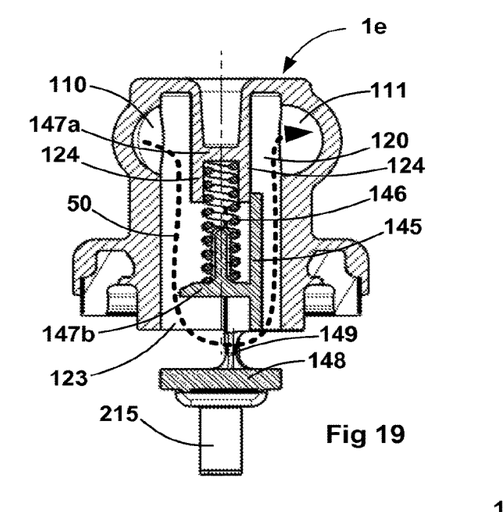
FIG. 19 shows a cross-section view E-E of the liquid-vapor separator according to the fifth embodiment of the invention arranged in the first configuration.
Figure 20:
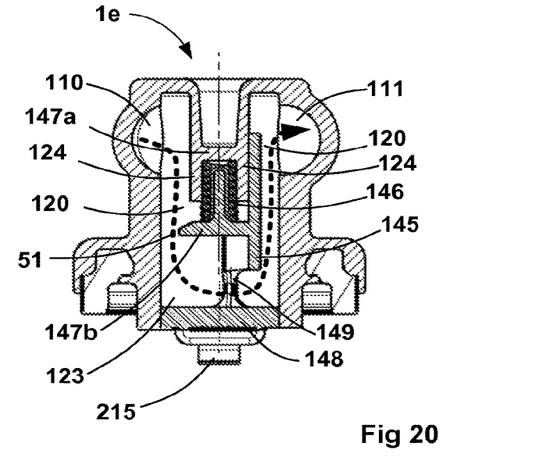
FIG. 20 shows a cross-section view E-E of the liquid-vapor separator according to the fifth embodiment of the invention arranged in the second configuration.

FIGS. 19 and 20 show a cross-section view along E-E of said separator placed respectively in the first and the second configurations.

The liquid-vapor separator comprises at least one fixed partition 124 extending vertically from the upper part of the hollow body, against which a movable wall 145 slides in direction XX' parallel to the wall 124. Preferably, the direction is vertical.

In the first configuration, the movable wall 145 is arranged in the lower part of the hollow body such that the walls 124, extended by the height of the movable wall 145, form a labyrinth in which the vapor flow from the inlet pipe 110 to the outlet pipe is forced to circulate following a first path 50.

In the second configuration, the movable wall 145 is raised into the upper part of the hollow body such that the wall 145 covers all or part of the wall 124. The labyrinth formed by the walls 124 and 145 defines a shorter path 51 via which the vapor flow circulates from the inlet pipe 110 to the outlet pipe. Since the passage between the inlet pipe and outlet pipe is shorter than in the first configuration, the load losses between the inlet pipe and outlet pipe are then reduced.

The wall 145 is connected to a lower support plate 147b on which a spring 146 rests, which comes to stop against an upper support plate 147a fixed to the two walls 124.

The lower support plate is connected by a connecting foot 149 to a shutter 148 carrying a lug 215.

Under the action of introducing the nozzle 3 (not shown), the lug 215 is raised vertically and drives the upward translation movement of the wall 145 and the shutter 148. The spring 146 is compressed.

The shutter 148 then closes the communication between the drainage pipe 123 and the receiving pipe 200 (not shown). The liquid-vapor separator 1e is then arranged in the second configuration illustrated by FIG. 20.

When the nozzle is withdrawn, the spring 146 causes the partition 145 to descend towards the bottom of the hollow body, pushing back the lower plate 147b and the shutter 148, so as to return the liquid-vapor separator to the first configuration illustrated by FIG. 19.

Figure 21:
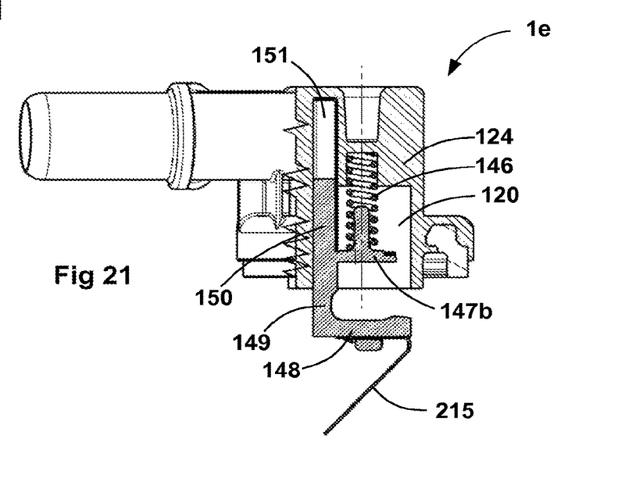
FIG. 21 shows a cross-section view C-C of the liquid-vapor separator according to the fifth embodiment of the invention arranged in the first configuration.

In order to ensure perfect guidance of the partition 145 and the shutter 148 in the vertical direction XX', the lower support plate 147b is connected to a guide finger 150, extending the connecting foot 149 and sliding in a guide 151 arranged in a wall of the hollow body 120 as illustrated in FIG. 21.

The method of filling a tank according to the invention then comprises the steps during which:
- the separating means are placed in the second configuration when a nozzle is introduced into the receiving pipe of the filler neck, such that the vapors from the tank pass directly towards the vapor treatment means during the filling phase, and
- the separating means are returned to the first configuration when the nozzle is withdrawn from the filler neck pipe, such that the vapors from the tank pass over said separating means before being directed towards said vapor treatment means.

The five embodiments of the invention forming the basis for the present description are not limitative insofar as they allow the effects as described and claimed to be obtained.

Throughout the description and claims, it is considered that the liquid-vapor separator is oriented as shown on the figures, namely with a vertical axis and horizontal inlet and outlet pipes. Reference is made to the vertical and horizontal directions taking into account this orientation of the liquid-vapor separator, which is the most favorable for the evacuation of droplets via the drainage pipe which is then vertical. However, it remains within the scope of the invention for the liquid-vapor separator to be inclined, in particular because of the effective position of the neck in a motor vehicle and the space available about the neck. In this case, the vertical may be understood as the longitudinal direction of the hollow body of the separator, and the horizontal as the direction of the inlet pipe when it opens into the hollow body.

NOMENCLATURE OF REFERENCE NUMERALS USED 1, 1a, 1b, 1c, 1d, 1e Liquid-vapor separator
110 Inlet pipe of vapor flow coming from fuel tank
111 Outlet pipe of vapor flow towards canister
112 Section of the intersection of the inlet pipe with the wall of the hollow body
113 Section of the intersection of the outlet pipe with the wall of the hollow body
114 Return spring
115 Mechanism for driving the upper plate in rotation
120 Hollow body
121 Walls of the drainage pipe
122 Walls of the hollow body
123 Drainage pipe
124 Separating means, fixed walls
130 Separating means; wall movable about a vertical rotation axis (XX')
130a, 130b Separating means; walls movable about a vertical rotation axis (XX')
131 Upper plate
132 Lower plate
133 Helicoidal ramp
134 Isolating partition
135 Separating means; wall movable about a horizontal rotation axis (YY')
136 Hinge of movable wall with horizontal axis (YY')
137 Extension piece
138 Elastic blade of the extension piece
139 Movable piston 139a Head of movable piston
139b Separating means; wall of movable piston
140 Connecting rod
141 Connecting rod drive arm
142 Return spring of connecting rod drive arm
143 Connecting pin between the wall of the movable piston and the connecting rod
144 Connecting pin between the drive arm and the connecting rod
145 Separating means; movable wall
146 Return spring of movable wall
147a Upper support plate
147b Lower support plate
148 Shutter
149 Connecting foot
150 Guide finger
151 Guide
200 Receiving pipe of the neck
201 Head of the filler neck towards the receiving pipe
202 Outlet of receiving pipe of the filler neck
210 Valve
211 Hinge of valve 210
212 Elastic blade of valve
213 Cam
214 Elastic lever
215 Lug
216 Plate
217 Hinge of elastic lever
218 Decentered shaft
219 Flap
3 Fuel filling nozzle
4 Fuel tank
40 Instrumentation of fuel tank
41 Fuel filler neck
42 Degasifier
43 Fuel vapor evacuation duct
44 Vapor treatment means; canister
50 Gas path in first configuration
51 Gas path in second configuration

The invention claimed is:

1. A filler neck of a fuel tank comprising:
a receiving pipe to receive a filling nozzle; and
a liquid-vapor separator, comprising a hollow body into which a single vapor flow inlet pipe from the fuel tank, a drainage pipe flowing into the receiving pipe, and a vapor outlet pipe open, the hollow body including separating means allowing extraction of droplets present in the vapor flow such that they flow into the drainage pipe;
wherein the separating means comprises at least one wall movable between a first and a second configuration such that:
in the first configuration, the movable wall is disposed substantially vertically and together with walls of the hollow body forms a path in which the vapor flow passing from the inlet pipe to the outlet pipe is forced to circulate along said movable wall so that fuel droplets contained in the vapor are deposited on the movable wall and flow by gravity to the receiving pipe; and
in the second configuration, the movable wall is arranged to define a passage in which the vapor flow circulates from the inlet pipe to the outlet pipe along a path avoiding all or part of the path taken by the vapors when the movable wall is in the first configuration, a cross-section of the passage being arranged such that load loss suffered by the vapor flow circulating in the hollow body between the inlet pipe and the outlet pipe is strictly smaller than that suffered by a same vapor flow when the movable wall is in the first configuration.

2. The filler neck as claimed in claim 1, wherein the separating means of the liquid-vapor separator comprises at least one wall movable in rotation about a vertical axis.

3. The filler neck as claimed in claim 2, wherein the hollow body of the liquid-vapor separator has a general form of a cylinder with a same axis as the axis of rotation of the movable wall, and a circular cross-section, an inner diameter of which is substantially equal to a width of the movable wall.

4. The filler neck as claimed in claim 2, wherein the separating means of the liquid-vapor separator comprises two movable walls, arranged such that when placed in the second configuration, sections of an intersection of the inlet pipe and the outlet pipe with the hollow body are contained in a space located between the two movable walls.

5. The filler neck as claimed in claim 4, further comprising an isolating partition connecting together the two movable walls and arranged such that when the movable walls are placed in the second configuration, the inlet pipe and the outlet pipe communicate via a passage isolated from the drainage pipe and contained between the two movable walls and situated between an upper plate and the isolating partition.

6. The filler neck as claimed in claim 1, further comprising a valve movable between an open position opening the passage between the drainage pipe and the receiving pipe when the separating means is in the first configuration, and a closed position closing the communication between the drainage pipe and the receiving pipe when the separating means is in the second configuration.

7. The filler neck as claimed in claim 1, wherein the separating means of the liquid-vapor separator comprises at least one wall movable in rotation about a horizontal axis.

8. The filler neck as claimed in claim 7, wherein:
in the first configuration, the movable wall of the liquid-vapor separator is arranged substantially perpendicular to the vapor flow entering the hollow body via the inlet pipe,
in the second configuration, the movable wall of the liquid-vapor separator is arranged such that the inlet pipe and the outlet pipe are isolated from the drainage pipe.

9. The filler neck as claimed in claim 7, wherein the hollow body of the liquid-vapor separator has a substantially cylindrical or hemispherical form, and wherein the movable wall pivots about an axis situated in an equatorial plane of the hollow body and has a form similar to an inner equatorial cross-section of the hollow body.

10. The filler neck as claimed in claim 1, wherein the separating means of the liquid-vapor separator is movable in translation along a vertically oriented axis in a direction.

11. The filler neck as claimed in claim 10, wherein the hollow body has a substantially cylindrical form, and wherein the separating means comprises a piston movable in translation inside the hollow body and comprises a head, cross-section of which corresponds to an inner cross-section of the hollow body, and a wall extending below the head substantially perpendicular to the vapor flow entering the hollow body via the inlet pipe, such that:
in the first configuration, sections of intersection of the inlet pipe and outlet pipe with the hollow body are arranged below the head of the movable piston, such that the wall of the movable piston together with the walls of the hollow body forms a path in which the vapor flow passing from the inlet pipe to the outlet pipe is forced to circulate along said wall so that fuel droplets contained in the vapor are deposited on the movable wall and flow by gravity to the receiving pipe, in the second configuration, the sections of intersection of the inlet pipe and outlet pipe with the hollow body are arranged above the head of the movable piston to isolate the inlet pipe and the outlet pipe from the drainage pipe.

12. The filler neck as claimed in claim 10, wherein the separating means comprises at least one fixed wall extending from the upper part of the hollow body in a direction substantially perpendicular to the vapor flow entering the hollow body via the inlet pipe, along which fixed wall a movable wall slides parallel to the fixed wall, such that:

in the first configuration, the movable wall is arranged in an extension of the fixed wall such that the fixed wall extended by the height of the movable wall together with the walls of the hollow forms a path which the vapor flow circulates from the inlet pipe to the outlet pipe along said fixed wall and movable wall so that fuel droplets contained in the vapor are deposited on the fixed wall and the movable wall and flow by gravity to the receiving pipe, in the second configuration, the movable wall is superposed over the fixed wall such that the fixed wall and a part of the movable wall together with the walls of the hollow body forms a path shorter than in the first configuration in which the vapor flow circulates from the inlet pipe towards the outlet pipe.

13. The filler neck as claimed in claim 12, wherein the movable wall is connected via a connecting foot to a shutter such that when the movable wall is arranged in the first configuration, the shutter opens a passage between the drainage pipe and the receiving pipe, and when the movable wall is arranged in the second configuration, the shutter closes a passage between the drainage pipe and the receiving pipe.

14. The filler neck as claimed in claim 1, further comprising means for activating passage of the liquid-vapor separator from the first configuration to the second configuration when the nozzle is introduced into the receiving pipe of the filler neck.

15. The filler neck as claimed in claim 1, wherein the liquid-vapor separator comprises elastic means for causing the liquid-vapor separator to pass from the second configuration to the first configuration when the nozzle is withdrawn from the receiving pipe of the filler neck.

16. A filler neck of a fuel tank comprising:
a receiving pipe to receive a filling nozzle; and
a liquid-vapor separator, comprising a hollow body into which a single vapor flow inlet pipe from the fuel tank, a drainage pipe flowing into the receiving pipe, and a vapor outlet pipe open, the hollow body including at least one wall movable between a first and a second configuration, the movable wall allowing extraction of droplets present in the vapor flow such that they flow into the drainage pipe;
wherein, in the first configuration, the movable wall is disposed substantially vertically and together with walls of the hollow body forms a path in which the vapor flow passing from the inlet pipe to the outlet pipe is forced to circulate along said movable wall so that fuel droplets contained in the vapor are deposited on the movable wall and flow by gravity to the receiving pipe; and
wherein, in the second configuration, the movable wall is arranged to define a passage in which the vapor flow circulates from the inlet pipe to the outlet pipe along a path avoiding all or part of the path taken by the vapors when the movable wall is in the first configuration, a cross-section of the passage being arranged such that load loss suffered by the vapor flow circulating in the hollow body between the inlet pipe and the outlet pipe is strictly smaller than that suffered by a same vapor flow when the movable wall is in the first configuration.

* * * * *